United States Patent
Komori et al.

(10) Patent No.: US 8,632,619 B2
(45) Date of Patent: Jan. 21, 2014

(54) FILTER ELEMENT, IN PARTICULAR FOR FILTERING EXHAUST GASES OF AN INTERNAL COMBUSTION ENGINE

(75) Inventors: Teruo Komori, Ogaki (JP); Rainer Mueller, Stuttgart (DE); Lars Thuener, Royal Oak, MI (US)

(73) Assignee: Robert Bosch GmbH, Stuttgart (DE)

( * ) Notice: Subject to any disclaimer, the term of this patent is extended or adjusted under 35 U.S.C. 154(b) by 882 days.

(21) Appl. No.: 12/303,724

(22) PCT Filed: Jul. 27, 2007

(86) PCT No.: PCT/EP2007/057751
§ 371 (c)(1),
(2), (4) Date: Jun. 23, 2010

(87) PCT Pub. No.: WO2008/034664
PCT Pub. Date: Mar. 27, 2008

(65) Prior Publication Data
US 2010/0263340 A1 Oct. 21, 2010

(30) Foreign Application Priority Data
Sep. 18, 2006 (DE) .......................... 10 2006 043 706

(51) Int. Cl.
*B01D 39/14* (2006.01)
*B01D 39/06* (2006.01)
*B01D 24/00* (2006.01)
*B01D 50/00* (2006.01)

(52) U.S. Cl.
USPC ................. 55/523; 55/522; 55/524; 422/169; 422/170; 422/171; 422/172; 422/177; 422/178; 422/179; 422/180; 422/181; 422/182

(58) Field of Classification Search
USPC ............ 55/522–524; 422/169–172, 177–182; 60/297
See application file for complete search history.

(56) References Cited

U.S. PATENT DOCUMENTS

| | | | |
|---|---|---|---|
| 4,335,783 A * | 6/1982 | McBrayer et al. | 165/8 |
| 4,642,210 A * | 2/1987 | Ogawa et al. | 264/631 |
| 5,063,029 A | 11/1991 | Mizuno et al. | |
| 5,914,187 A * | 6/1999 | Naruse et al. | 428/327 |
| 6,328,777 B1 * | 12/2001 | Benthaus et al. | 55/385.3 |
| 6,797,666 B2 * | 9/2004 | Harada et al. | 502/180 |
| 7,531,231 B2 * | 5/2009 | Okumura et al. | 428/116 |
| 7,547,343 B2 * | 6/2009 | Bardon et al. | 55/523 |
| 7,892,623 B2 * | 2/2011 | Ohno et al. | 428/116 |

(Continued)

FOREIGN PATENT DOCUMENTS

| | | |
|---|---|---|
| EP | 1 153 643 | 11/2001 |
| EP | 1 283 067 | 2/2003 |

(Continued)

OTHER PUBLICATIONS

International Search Report, PCT/EP2007/057751, dated Oct. 29, 2007.

*Primary Examiner* — Amber Orlando
(74) *Attorney, Agent, or Firm* — Kenyon & Kenyon LLP

(57) ABSTRACT

A filter element, in particular for filtering exhaust gases of an internal combustion engine, includes mutually parallel flow channels, at least two filter segments being provided which each have a subset of flow channels, the filter segments having a spacing from one another and being interconnected via connecting device(s) arranged integrally with the filter segments.

19 Claims, 4 Drawing Sheets

(56) References Cited

U.S. PATENT DOCUMENTS

| | | | |
|---|---|---|---|
| 2002/0197193 A1* | 12/2002 | Harada et al. | 422/177 |
| 2003/0140608 A1* | 7/2003 | Hamanaka et al. | 55/523 |
| 2004/0142145 A1 | 7/2004 | Hashimoto et al. | |
| 2004/0211164 A1* | 10/2004 | Hamanaka et al. | 55/523 |
| 2005/0178098 A1* | 8/2005 | Ono et al. | 55/523 |
| 2006/0150597 A1* | 7/2006 | Masukawa et al. | 55/523 |

FOREIGN PATENT DOCUMENTS

| | | |
|---|---|---|
| EP | 1 413 344 | 4/2004 |
| EP | 1 736 459 | 12/2006 |
| JP | 50-114409 | 9/1975 |
| JP | 6-305847 | 11/1994 |
| JP | 2002-60279 | 2/2002 |
| JP | 2003-10616 | 1/2003 |
| JP | 2005-518267 | 6/2005 |

* cited by examiner

FILTER ELEMENT, IN PARTICULAR FOR FILTERING EXHAUST GASES OF AN INTERNAL COMBUSTION ENGINE

FIELD OF THE INVENTION

The present invention relates to a filter element, in particular for filtering exhaust gases of an internal combustion engine, and to a particle filter and to an exhaust emissions control system having a filter element. The present invention further relates to a method for manufacturing a filter element.

BACKGROUND INFORMATION

These filter elements can be manufactured by extrusion, in which context a ceramic material is pressed through an extrusion tool so that a prismatic body having a plurality of flow channels arranged in mutually parallel fashion is created. The extrusion operation is followed by a firing or sintering operation.

Both cordierite and silicon carbide can be used for the known filter elements. A difference between these two materials is that the thermal expansion of cordierite is substantially less than the thermal expansion of silicon carbide. For this reason, filter elements manufactured from silicon carbide are not produced "en bloc," i.e. as a monolith, but instead are assembled from multiple filter segments. Each filter element encompasses a subset of mutually parallel flow channels. These filter segments form subunits ("bricks") that are manufactured individually and then assembled into a filter element using a ceramic adhesive bonding agent.

SUMMARY

Example embodiments of the present invention provide a filter element that is as easy as possible to manufacture.

In the context of a filter element, the filter segments have a spacing from one another, and are interconnected via connecting device(s) arranged integrally with the filter segments.

The filter element can be manufactured in the context of only one extrusion operation, with no need for the individual filter segments subsequently to be interconnected via separate connecting devices, for example an adhesive. The fact that the filter segments are spaced apart from one another creates a space permitting a filter segment to expand during a firing or sintering operation, without thereby being itself exposed to large internal stresses or exposing an adjacent filter segment to a large compressive stress.

The fact that the filter element can be manufactured in only one extrusion operation also means that only one corresponding extrusion tool needs to be made available. With conventional filter elements, on the other hand, either specific tools must be made available for the respective filter segments, or filter segments initially identical in cross section must be adapted in terms of their contour by grinding, after they have been adhesively bonded to one another. This is associated with a large loss of material, which can be avoided with the filter element according to example embodiments of the present invention.

The geometry of the filter element is advantageous especially in the context of filter elements that are constituted at least in part from silicon carbide. The fact that the filter segments can also be made, at least in part, of cordierite or also of another material is nevertheless within the present context.

The filter segments can complement one another to yield a filter element that is cylindrical in its entirety. The diameter of this filter element can be, for example, between 10 and 18 cm, in particular 5.66 inches. The filter segments can be in cross section, for example, between 400 and 1600 square millimeters in size.

The filter element has at least two filter segments, but preferably at least four filter segments. Formed between the respectively mutually adjacent filter segments are interstices, into which filter segments that heat up during manufacture of the filter element or upon operation thereof can expand.

The filter segments have a cross section that is at least sufficiently large that a number of mutually parallel flow channels can be received. At least for a centrally disposed filter segment, however, square or circular cross sections can be advantageous in order to permit a globally uniform distribution of filter segments over the cross section of the filter element.

The spacing between the filter segments can be comparatively small as compared with the size of the cross section of one filter segment, for example between 0.5 and 10 mm, in particular between 1 and 5 mm. The spacing is intended to make available a sufficiently large expansion space for the filter segments, but on the other hand should not be unnecessarily large so as not to reduce too greatly the total available filter area.

Mutually adjacent filter segments can be interconnected in only one region or also via multiple connecting means. Advantageously, a connecting device is arranged as a strut that extends parallel to the flow channels. Such a strut has a width that corresponds to the spacing between mutually adjacent filter segments. The material thickness present perpendicular thereto can be between 0.5 and 10 mm. It is advantageous, however, if the material thickness of the strut is less than the wall thickness of a filter wall, adjoining a flow channel, of a filter segment.

In order further to reduce the stresses that occur during heating of the filter element, it is proposed that the strut have in a central region a material thickness that is less than in the outer regions directly adjacent to the filter segments. As a result, the strut can deform to a limited extent in its central region without thereby causing permissible limit stresses to be exceeded. In order to provide good protection for the filter segments from mechanical overloads, it is proposed that the flexural strength of the strut, in particular in its central region, be equal to at most 60% of the flexural strength of a filter segment.

An example embodiment provides that the interstice resulting from the spacing between two interconnected filter segments is filled up at least in sections with a filler material. With the filler material, the mechanical stability of the interconnected filter segments, and thus of the filter element, can be enhanced. The filler material used can be, for example, ceramic powder, inorganic binder, and/or ceramic fibers. The filler material need not completely fill up the interstice formed between the filter segments in the direction parallel to the flow channels. It is preferred, however, if at least 20% of the length of the flow channel is filled up.

Further features and aspects of example embodiments of the present invention are described in more detail below. All features described in the drawings and the description thereof may be provided both individually and in any combination with one another.

DETAILED DESCRIPTION

Figure 1:
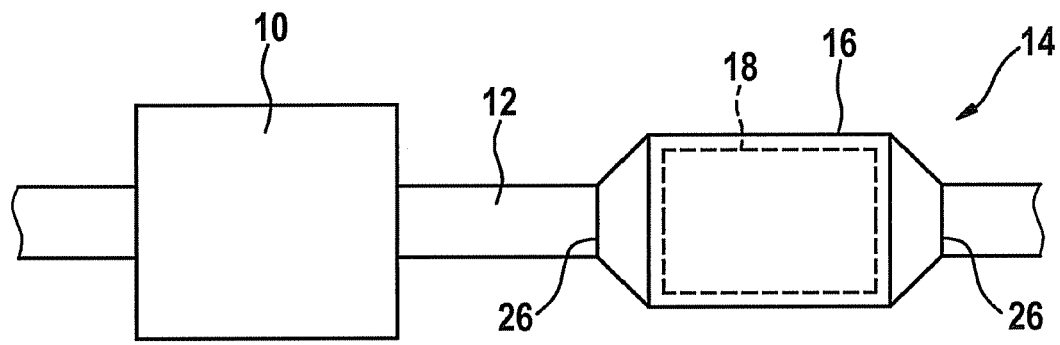
FIG. 1 schematically depicts an internal combustion engine having an exhaust emissions control system and having a filter element.

In FIG. 1, an internal combustion engine bears the reference character 10. Exhaust gases are directed through an exhaust pipe 12 to an emissions control system 14. The latter encompasses a particle filter 16 with which carbon particles are filtered out of the exhaust gas flowing in exhaust pipe 12. This is necessary especially in diesel internal combustion engines in order to comply with regulatory stipulations.

Particle filter 16 encompasses a filter element 18 that is substantially cylindrical in its entirety.

Figure 2:
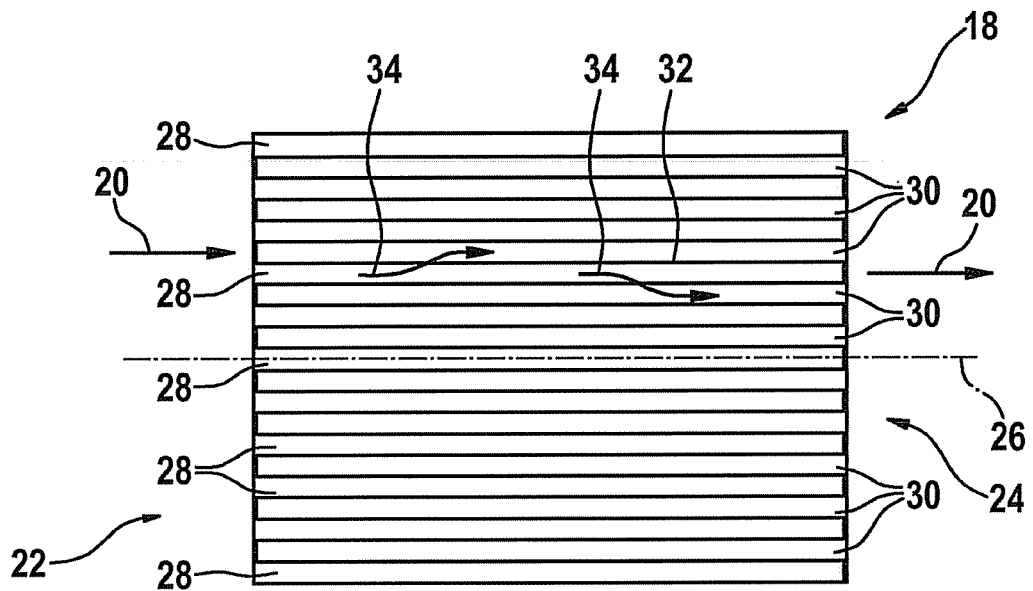
FIG. 2 is a longitudinal section through a conventional filter element.

FIG. 2 depicts, in a longitudinal section, a conventional filter element 18. Through this, exhaust gas of internal combustion engine 10 flows in the direction of arrows 20. In FIG. 2, an entrance surface for the exhaust gas to be filters bears the reference character 22, and an exit surface for filtered exhaust gas bears the reference character 24.

Multiple flow channels 28 and 30 proceed parallel to a longitudinal axis 26 of filter element 18. Flow channels 28 are open at entrance surface 22 and closed at exit surface 24. Conversely, flow channels 30 are open at exit surface 24 and closed in the region of entrance surface 22.

The flow path of the unpurified exhaust gas is thus into one of flow channels 28 and from there through a filter wall 32 into one of flow channels 30, This is depicted by way of example by arrows 34.

Figure 3:
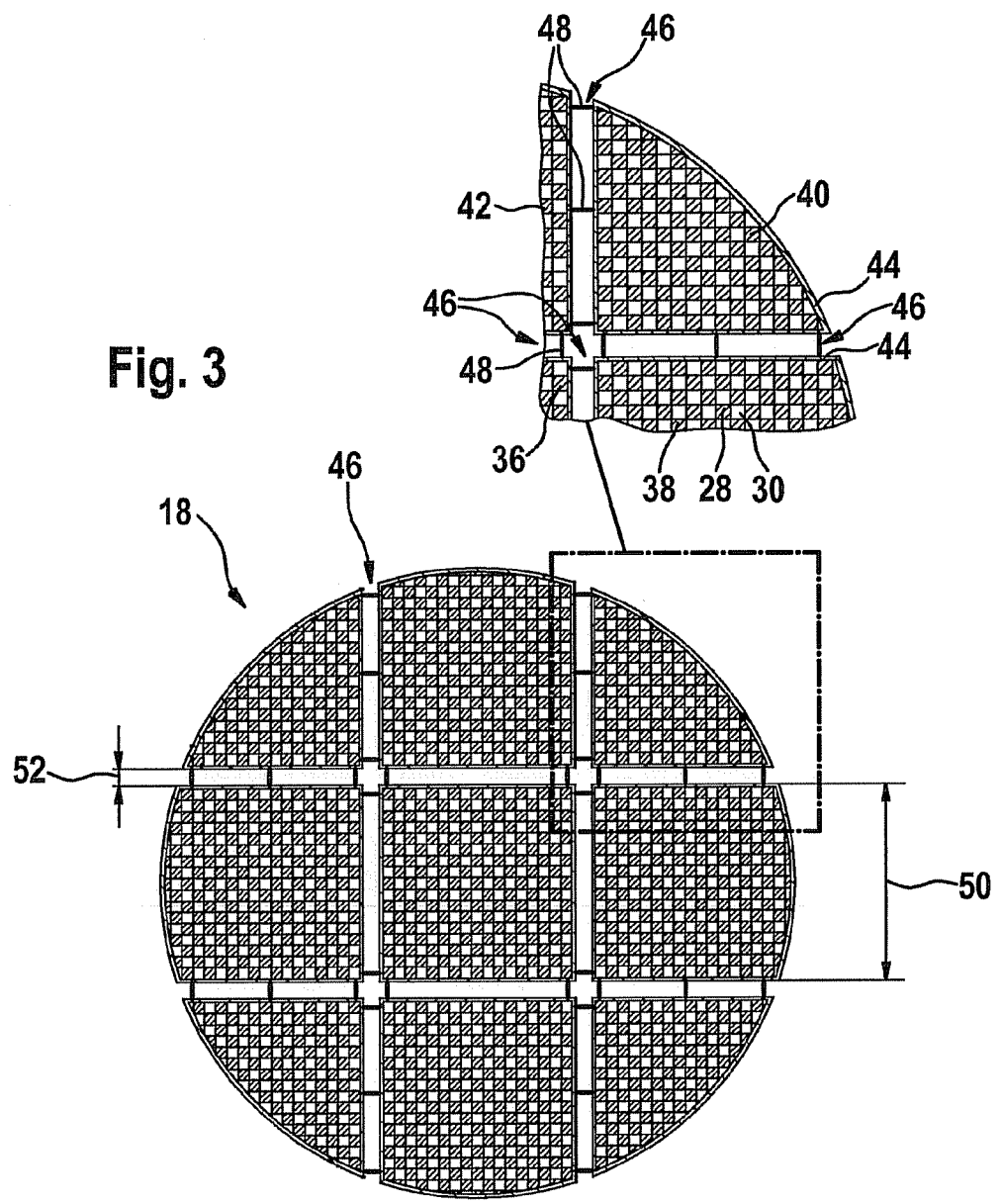
FIG. 3 is a cross section through a filter element according to an example embodiment of the present invention having filter segments connected via struts.

In FIG. 3, a filter element according to an example embodiment of the present invention is labeled in its entirety with the reference character 18. It has, in totality, filter segments, of which four filter segments are labeled in FIG. 3 with the reference characters 36 to 42. These filter segments are delimited by segment boundaries 44. The segment boundaries of mutually adjacent filter segments, for example of filter segments 38 and 40, are spaced apart from one another so that an interstice 46 is constituted in this region. This interstice 46 is spanned by strut-shaped connecting means 48 that interconnect the filter segments.

In the example embodiment depicted in FIG. 3, the centrally disposed filter segment 36 is square in cross section. This filter segment preferably has a cross section of from 400 to 1600 square millimeters. The individual filter segments have a spacing 52 from one another of, for example, 0.5 to 10 mm.

Figure 4:
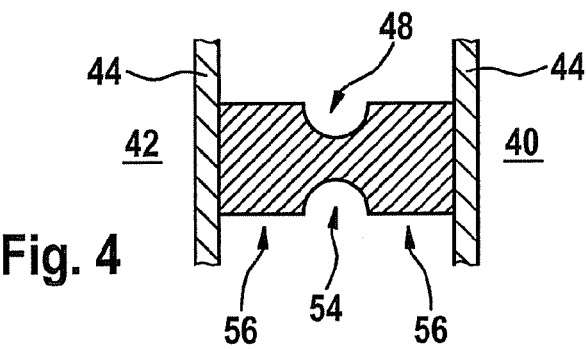
FIG. 4 is a cross section through a strut depicted in enlarged fashion.

FIG. 4 depicts in further detail a strut-shaped connecting device 48 and its connection to the segment boundaries 44 of mutually adjacent filter segments 40 and 42. Connecting device 48 has a central region 54 that has a material thickness which is less than that of the laterally contiguous outer regions 56 that are disposed directly adjacent to segment boundaries 44. In the exemplifying embodiment depicted in FIG. 4, the lesser material thickness in central region 54 is produced by trough-shaped notches located opposite one another.

Figure 5:
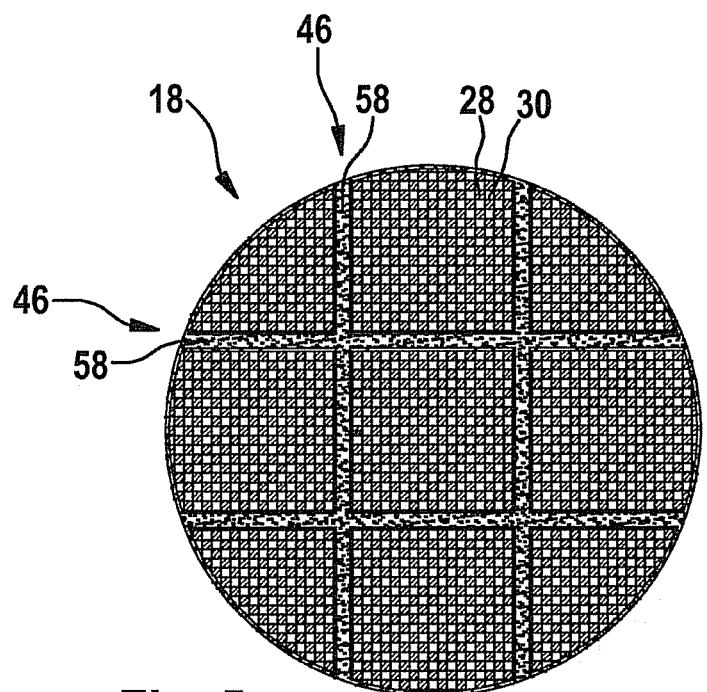
FIG. 5 is a cross section through the filter element according to FIG. 3 having filled-up interstices.
Figure 6:
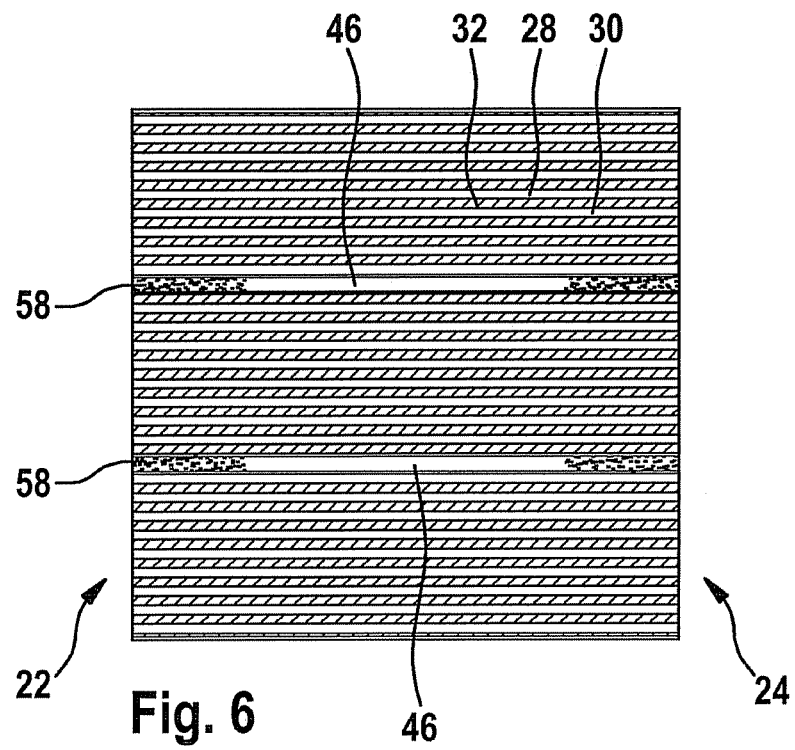
FIG. 6 is a longitudinal section through the filter element according to FIG. 5.

Filter element 18 is depicted in FIG. 5 with interstices 46 that are filled with a filler material 58. Referring to FIG. 6, filler material 58 does not extend along the entire length of a flow channel 28 or 30, but instead only in a respective region adjacent to entrance surface 22 or exit surface 24.

Figure 7:
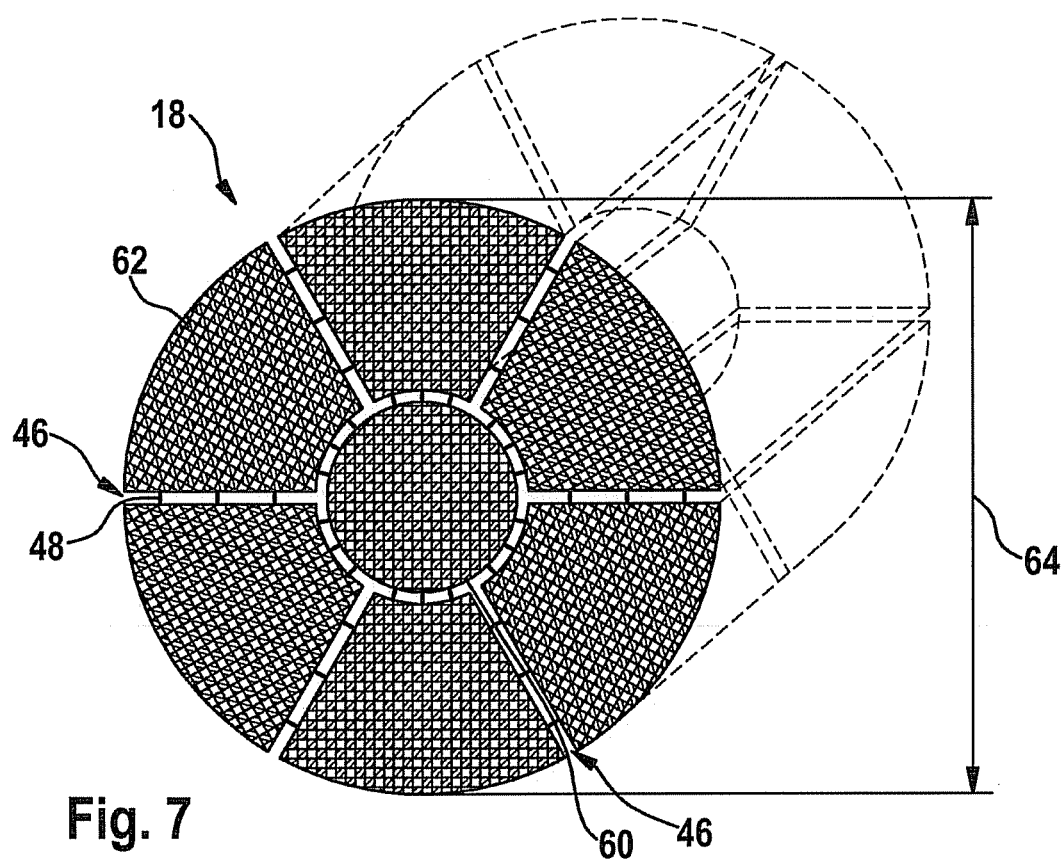
FIG. 7 is a cross section through a filter element according to an example embodiment of the present invention.

FIG. 7 shows a further example embodiment of a filter element 18 according to the present invention. Provided in this filter element is a centrally arranged filter segment 60 that is circular in cross section and is surrounded by multiple filter segments 62. Filter segments 62 are assembled in the shape of circle segments and form a ring surrounding central filter segment 60. Each two of the individual filter segments 60, 62 are in turn interconnected via connecting device 48 arranged integrally with the filter segments.

Diameter 64 of this filter element 18 can be, for example, 5.66 inches.

What is claimed is:

1. A filter element, comprising:
    at least two filter segments each having a subset of flow channels of mutually parallel flow channels;
    wherein the filter segments have a spacing from one another and are interconnected via a connection arrangement provided integrally with the filter segments, multiple connecting devices being provided between mutually adjacent filter segments;
    wherein the connecting devices are arranged as a strut that extends parallel to the flow channels; and
    wherein a material thickness of the strut is less than the wall thickness of a filter wall, adjoining a flow channel, of a filter segment.

2. The filter element according to claim 1, wherein the filter element is adapted to filter exhaust gases of an internal combustion engine.

3. The filter element according to claim 1, wherein the filter segments are made at least in part of silicon carbide.

4. The filter element according to claim 1, wherein the filter segments are made at least in part of cordierite.

5. The filter element according to claim 1, wherein the filter segments complement one another to yield a filter element that is cylindrical in entirety.

6. The filter element according to claim 1, wherein the filter segments are, in cross section, between 400 and 1600 square millimeters in size.

7. The filter element according to claim 1, wherein the filter element has at least four filter segments.

8. The filter element according to claim 1, wherein at least one centrally disposed filter segment is square in cross section.

9. The filter element according to claim 1, wherein at least one centrally disposed filter segment is circular in cross section.

10. The filter element according to claim 1, wherein at least filter segments disposed along a periphery of the filter element are shaped at least in sections as a circle segment.

11. The filter element according to claim 1, wherein a cell density of the flow channels is between 80 and 350 channels per square inch.

12. The filter element according to claim 1, wherein the spacing between mutually adjacent filter segments is between 0.5 and 10 mm.

13. The filter element according to claim 1, wherein the strut has a material thickness between 0.5 and 10 mm.

14. The filter element according to claim 1, wherein the strut has in a central region a material thickness that is less than in outer regions directly adjacent to the filter segments.

15. The filter element according to claim 1, wherein a flexural strength of at least one of (a) the strut and (b) a central region of the strut is equal to at most 60% of a flexural strength of a filter segment.

16. The filter element according to claim 1, wherein an interstice resulting from the spacing between two interconnected filter segments is filled up at least in sections with a filler material.

17. The filter element according to claim 16, wherein the interstice is filled up, in a direction parallel to the flow channels, over at least 20% of a length of the flow channels.

18. The filter element according to claim 16, wherein the filler material includes at least one of (a) ceramic powder, (b) silicon dioxide, (c) aluminum oxide; (d) inorganic binder, (e) silicon dioxide sol, (f) aluminum oxide sol; (g) ceramic fibers, (h) mullite fibers, and (i) aluminum oxide fibers.

19. The filter element according to claim 12, wherein the spacing between mutually adjacent filter segments is between 1 and 5 mm.

\* \* \* \* \*

UNITED STATES PATENT AND TRADEMARK OFFICE
CERTIFICATE OF CORRECTION

PATENT NO.        : 8,632,619 B2                                          Page 1 of 1
APPLICATION NO.   : 12/303724
DATED             : January 21, 2014
INVENTOR(S)       : Komori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1345 days.

Signed and Sealed this
Twenty-second Day of September, 2015

Michelle K. Lee
*Director of the United States Patent and Trademark Office*